United States Patent [19]

Gnehm

[11] Patent Number: 5,105,300

[45] Date of Patent: Apr. 14, 1992

[54] INTERFERENCE TYPE LOW VOLTAGE OPTICAL LIGHT MODULATOR

[75] Inventor: Christopher M. Gnehm, Kirkland, Wash.

[73] Assignee: BodyScan Medical Corporation, Kent, Wash.

[21] Appl. No.: 620,367

[22] Filed: Nov. 29, 1990

[51] Int. Cl.⁵ ............................ G02F 1/01; G02F 1/03
[52] U.S. Cl. ................................ 359/240; 359/251; 359/254
[58] Field of Search ............ 350/350 S, 389, 392, 350/404, 356, 96.13, 96.14, 96.21

[56] References Cited

U.S. PATENT DOCUMENTS

| | | | |
|---|---|---|---|
| 4,222,638 | 9/1980 | Robert | 350/356 |
| 4,752,120 | 6/1988 | Shimizu | 350/96.13 |
| 4,775,207 | 10/1988 | Silberberg | 350/96.13 |
| 4,820,009 | 4/1989 | Thaniyavarn | 350/356 |
| 4,852,962 | 8/1989 | Nicia | 350/356 |
| 4,856,863 | 8/1989 | Sampsell et al. | 350/96.21 |

Primary Examiner—Eugene R. Laroche
Assistant Examiner—Evelynn A. Lester
Attorney, Agent, or Firm—Delbert J. Barnard

[57] ABSTRACT

A pair of fiber optic cables (12, 14) are connected at one end to a single light emitting diode (10). The second ends of the cables (12, 14) are connected to a first end of a polarized polyvinylidene fluoride film member (16), in a symmetrical relationship on opposite sides of a longitudinal centerline. The second end of the film member (16) includes a triangular recess formed by intersecting 45° edges (82, 84). A beam splitter (18) is positioned in the recess, with opposite end portions, one positioned to receive a beam of light from cable (12) and the other positioned to receive a beam of light from cable (14). The beam splitter redirects the two beams towards each other and towards a diagonal split (72) at the center of the beam splitter (18). A change in length of the film member (16) on one side of the longitudinal centerline will change the phase relationship of the two light beams where they meet at the split (72). A fiber optic cable (20) is connected to the beam splitter (118). The two light beams either cancel each other out or combine to produce a stronger light beam. Whichever condition occurs is received by the cable (20) and transmitted to a light analyzer (22).

10 Claims, 3 Drawing Sheets

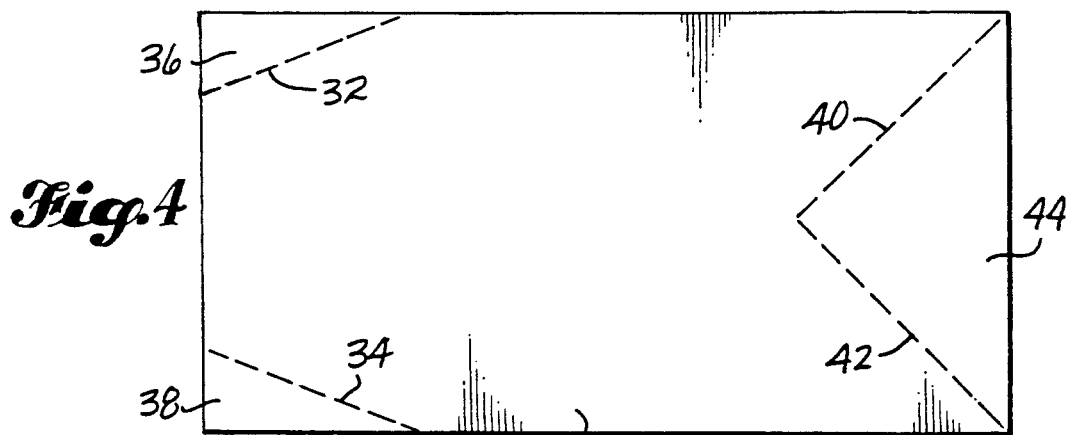
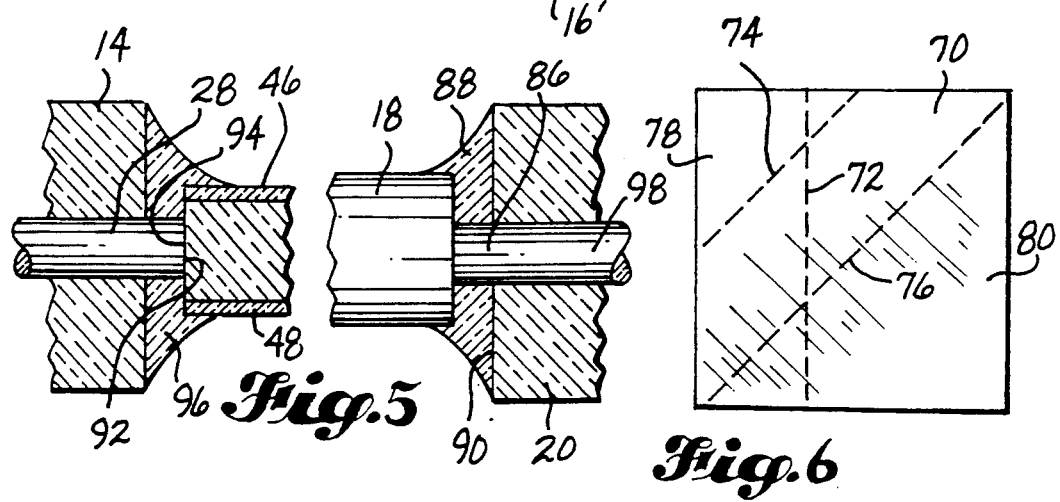
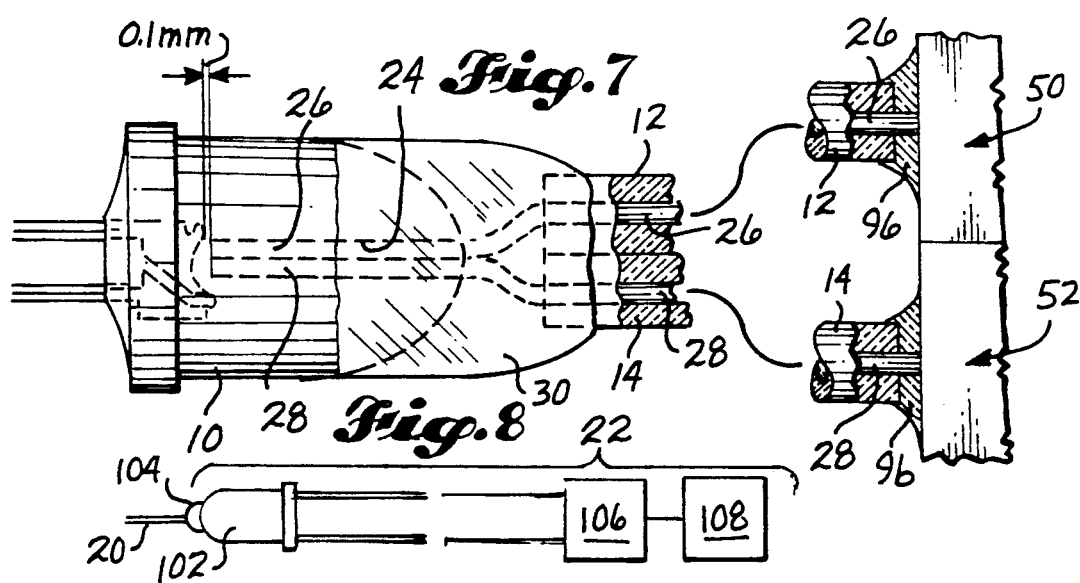

INTERFERENCE TYPE LOW VOLTAGE OPTICAL LIGHT MODULATOR

DESCRIPTION

1. Technical Field

This invention relates to optical modulators and, more particularly, to the provision of an interference type modulator which is adapted for high speed operation by application of extremely small voltages, or mechanical strain, and is composed of small, relatively inexpensive components.

2. Background Information

Inorganic crystal type electrooptical modulators are well known. Generally speaking, they operate in the following manner. Linearly polarized light is passed through a crystal medium exhibiting an electrooptical effect and the output beam is passed through another polarizer. A modulating electrical field is applied to control the eccentricity and orientation of elliptical polarization and hence the magnitude of the component of light in the direction of the output polarizer. Typically, the input linear polarization is oriented to have equal components along fast and slow axes of the crystal medium and the output polarizer is orthogonal to the input polarizer. The modulating field causes a phase differential varying from zero to $\pi$rad. This causes the polarization to change from linear (at zero) to circular (at $\pi/2$) to linear normal to the input polarization (at $\pi$). Thus the intensity passing through the output polarizer varies from zero to 100% as the phase differential varies from zero to $\pi$rad. See for example the "Electronics Engineers Handbook", Second Edition, by Donald G. Fink and Donald Christianson, published in 1982 by McGraw-Hill Book Company (Library of Congress Catalog No. TK7825.E34).

The medium that is typically used in optical modulators is an inorganic crystal material which is bulky, expensive and requires high voltage electrical fields to perform the modulating or switching function.

A principal object of the present invention is to provide an improved optical modulator which utilizes a polymer film medium which is small in size, is relatively inexpensive, and permits high speed modulation by use of very small applied voltages or mechanical strain. The optical modulators of the invention have immediate potential for information control in optical circuitry, laser modulation and deflection, and the like.

DISCLOSURE OF THE INVENTION

A first embodiment of optical light modulator constructed according to the invention is basically characterized by a Polarized polymer film member having first and second ends, first and second sides and a direction of piezo electric movement extending lengthwise of the film member. First and second electrodes are located on the first side of the film member, each extending lengthwise of the film member. The first and second electrodes are separated by a longitudinal gap. A third electrode is located on the second side of the film member. The third electrode has a pair of side portions, each extending lengthwise of the film member. The side portions are separated by a longitudinal gap extending through a major portion of the length of the film member. A pair of light sources are connected to the first end of the film member on opposite sides of the longitudinal gaps. A beam splitter is provided at the second end of the film member. The beam splitter has opposite end portions, each of which is positioned to receive light from a separate one of said light sources, which light has first traveled through the film member. A light analyzer is connected to a central portion of the beam splitter, at a position to receive light from both end portions of the beam splitter. The third electrode is connected to a constant zero voltage. In use, a variable voltage may be applied to the first and second electrodes. The voltage applied to the first and second electrodes may vary between positive and negative.

A positive voltage applied to either the first electrode or the second electrode will cause an increase of the length of the film member, in the region of the film member that is disposed between such electrode and the third electrode. Application of a negative voltage to either the first electrode or the second electrode will cause a shortening of the film member, in the region of the film member disposed between such electrode and the third electrode.

According to an aspect of the invention, the first, second and third electrodes each includes lateral breaks which facilitate length changes in the electrodes in response to length changes in the film material. Each light source may include a fiber optic cable connected to the first end of the film member. The opposite ends of the fiber optic cables may be connected to a single light emitting diode.

According to an aspect of the invention, a triangular recess is formed in the second end of the film member. This recess is defined by edge portions of the film member which are 90° apart. The beam splitter is an optical plate member having opposite ends cut to the angle of said edge portions (i.e. it has a 45° cut at each end). The ends of the beam splitter are coupled to the edge portions of the film member which define the triangular recess. The beam splitter includes a diagonal split at its center which is parallel to one of the edge portions of the recess. The light analyzer includes a fiber optic cable having an end connected to the beam splitter, in line with the diagonal split in the beam splitter and the longitudinal gaps on the two sides of the film member.

The modulator of the invention is an interference type modulator. The electrical input to the modulator causes a lengthening of the film member on one side of the longitudinal gaps and a shortening of the film member on the opposite sides of the longitudinal gaps. The light beams traveling through the film member from the two light sources thus travel paths which differ in length. The light beams are sinusoidal. The length change in the film material changes the length of each light beam and, owing to the sinusoidal nature of the light beam, it changes the phase angle at the end of each light beam. The two light beams meet at the diagonal break in the beam splitter. If the two beams meet in an out-of-phase relationship, they will cancel each other and no light will be detected by the light analyzer. If they meet in phase, they will produce a light beam of increased intensity.

Herein the term "optical modulator" is used to include optical switches, it being recognized that a switch stops light travel by modulating light intensity down to zero.

A second embodiment of the invention is characterized by a polarized polymer film member having first and second ends, first and second sides and a direction of piezo electric movement extending lengthwise of the film member. A pair of light sources are connected to the first end of the film member on opposite sides of a longitudinal centerline. A beam splitter is provided at the second end of the film member. The beam splitter has opposite end portions, each of which is positioned to receive light from a separate one of said light sources, which light has first traveled through the film member. A light analyzer is connected to a central portion of the beam splitter, at a position to receive light from both end portions of the beam splitter. In use, one side of the modulator is subjected to a strain condition which causes it to become longer or shorter than the second side. As in the first embodiment, the light beams traveling through the film member from the two light sources are caused to travel longitudinal paths which differ in length. In response, there is a phase angle change at the end of at least one light beam. If, the two light beams meet at the diagonal break in the beam splitter in an out-of-phase relationship, they will cancel each other and no light will be detected by the light analyzer. If they meet in phase, they will produce a light beam of increased intensity.

These and other objects, features and advantages of the invention are hereinafter described as a part of the description of the best mode.

BRIEF DESCRIPTION OF THE DRAWINGS

Like reference numerals are used to designate like parts throughout the several views of the drawing, and:

FIG. 4 is a plan view of a piece of polarized polymer film from which the modulator is formed;

FIG. 5 is an enlarged scale fragmentary view showing an end portion of a light source fiber optic cable coupled to a first end of the modulator, and an end portion of a modulated light fiber optic cable coupled to the beam splitter at the opposite end of the modulator, with the central main portion of the modulator cut away;

FIG. 6 is a top plan view of a glass blank from which the beam splitter is constructed;

FIG. 7 is an enlarged scale view showing first end portions of the two light source fiber optic cables coupled to a light emitting diode and showing the opposite ends of such cables coupled to a fragmentary first end portion of the modulator;

FIG. 8 is a diagram showing the output cable connected to a photodiode which in turn is connected to an amplifier and a signal utilization device; and shown in box diagram form.

BEST MODE FOR CARRYING OUT THE INVENTION

Figure 1:
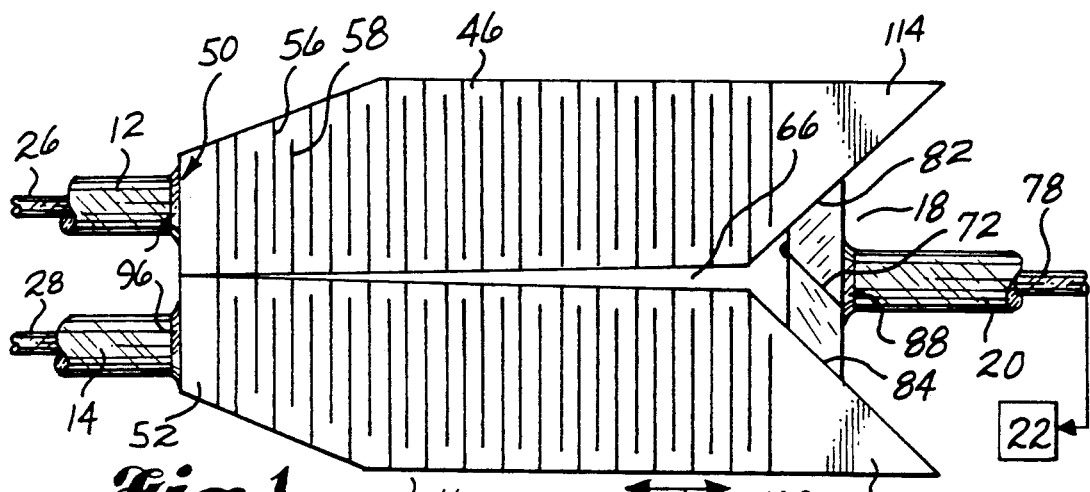
FIG. 1 is a plan view of a preferred embodiment of the modulator, showing end portions of two light source fiber optic cables connected to a first end of the modulator, a beam splitter at the second end of the modulator, and an end portion of a modulated light fiber optic cable coupled to the bea splitter, such view showing a pair of electrodes on a side of the modulator.

The modulator of the present invention is an interference type modulator. In preferred form it comprises a coherent light source 10 (FIG. 7) having a well defined wavelength profile, preferably operating between 550 nm and 780 nm, two single mode fiber optic light source cables 12, 14 of identical length which operate in the same wavelength as the light source, a polarized polymer film member 16, e.g. a PVDF film member measuring nine microns or less in thickness, to which a beam splitter 18 is coupled, a single mode polarization maintaining fiber optic cable 20 which operates in the same wavelength as the light source, and a photodiode/amplifier 22 having compatible operating parameters.

Referring to FIG. 7, the light source fiber optic cables 12, 14 are shown to be coupled to a light source diode 10. By way of example, a suitable diode 10 is a SHARP light emitting diode Model LT95120 ($\lambda_p$ equals 660 nm and peak intensity/ip equals 5000 mcd).

Diode 10 may be mounted in a precision jewelers drill press and a size "O" syringe tip may be used in the drill press to drill an axial hole or socket 24. A size "O" syringe tip will make a hole capable of receiving the cores 26, 28 two 100 micron diameter fiber optic cables 12, 14 in a side-by-side relationship. The hole or socket 24 is carefully drilled making sure that the drill is stopped at about 0.1 mm above the cathode bridge wire (FIG. 7). The drilled hole 24 is polished. The polishing may be performed by using a rounded end sewing needle of appropriate size dipped into a solution that is fifty percent ceriam oxide and fifty percent water. Next, the end portions of the fiber optic cables 12, 14 are prepared. The ends of the cores 26, 28 are cleaved and then inspected under a 300× microscope for a high quality cut. The outer surface of diode 10, and the hole 24, are cleaned (e.g. with alcohol) and the cores 26, 28 are then inserted into the opening 24. A Dow Corning optical fiber cement 30 is used to connect the cables 12, 14 to the lens portion of the diode 10. It is also possible to make the hole 24 large enough to receive two cable end portions which include the sheath.

FIG. 4 is a plan view of a polarized polymer film member 16' which has been cut to a rectangular shape, the size of which is substantially magnified. The film member 16' may actually measure about 1 cm by about 2 cm With the 2 cm length being parallel to the direction of piezo electric movement. The film material may be cut by any suitable cutting instrument. After the rectangular cut is made, two angle cuts 32, 34 are made at a first end so as to remove two triangular pieces 36, 38 from the member 16, At the opposite or second end of the member 16', cuts 40, 42 are made so as to remove a triangular section 44. All of the cut edges are inspected to assure that the cut edges are free of scratches and each forms a 90° angle to each surface of the resulting member.

By way of typical example, the film member 16 may be cut from a sheet of polarized polyvinylidene fluoride (PVDF). Physically. this material is a flexible, compliant or yielding, clear plastic film which can be readily cut. The material when "poled" has significant piezo electric and pyroelectric characteristics. These tWo macroscopic characteristics provide it with significant electro-optic characteristics, as will be described. The material, as with most polymers, contains molecular chains which move in an anisotropic direction when energized by an electric field. The material can be permanently "poled" by heating the material up to its "curie" temperature, i.e. the temperature in which it makes a marked change in magnetic properties and becomes paramagnetic, then applying a large D.C. potential across the film, and then allowing the film to cool with this potential. The poling process provides a permanent orientation of moleoular dipoles within the polymer. The molecular dipoles, also termed polarons, are stretched to a length of about four to five microns extending in the direction of the film thickness. Creation of an electric field in a second direction will cause the polarons to each rotate in position from a center of rotation which is located relatively close to one end of the polaron. This rotation of the polarons changes the way liqht travels through the material. Specifically, the rotation of the polarons causes signifioant changes in the Wavelength of the light that is transmitted endwise through the material. As will be explained, the introduction of a directional eleotrio field, and the rotational response by the molecular dipoles or polarons of the polymer, is used to modulate or control light transmission through the material. As will be shown, this modulation can be obtained by use of very low voltages.

The "poling" is performed during manufaoture of the polymer film. In a manner that is known per se, the film is coated on both sides with a conductive metal, e.g. vacuum deposited nickel oxide. These conductive metal layers are first used in the poling process. A positive voltage is connected to the metal on one side of the film and the metal on the opposite side of the film is connected to a negative voltage. In accordance with an aspect of the invention, the metal layers are later reconfigured to provide electrodes used to apply a direotional electric field to oause modulation.

The film member 16 must be prepared with great oare and exacting precision. The PVDF film must be cut in a manner 15 resulting in a flat edge at eaoh out 32, 34, 40, 42 having a minimal amount of scratches. By way of nonlimiting example, this cutting oan be done by the use of a pair of stainless steel scissors or a razor blade. Either method can be used to cut both the film and the metal layers on the film. If scissors are used, the blades must be honed flat and should be immersed in mineral oil. If a razor blade is used, the blade should be coated with mineral oil and supported between two guide surfaces which are perpendioular to the file while being moved along the material to make the cut. It was found that either one of these methods could provide a well controlled edge cut. A precision straight cut is critical beoause the ends 14, 16 are where light loss potential is the greatest.

Figure 2:
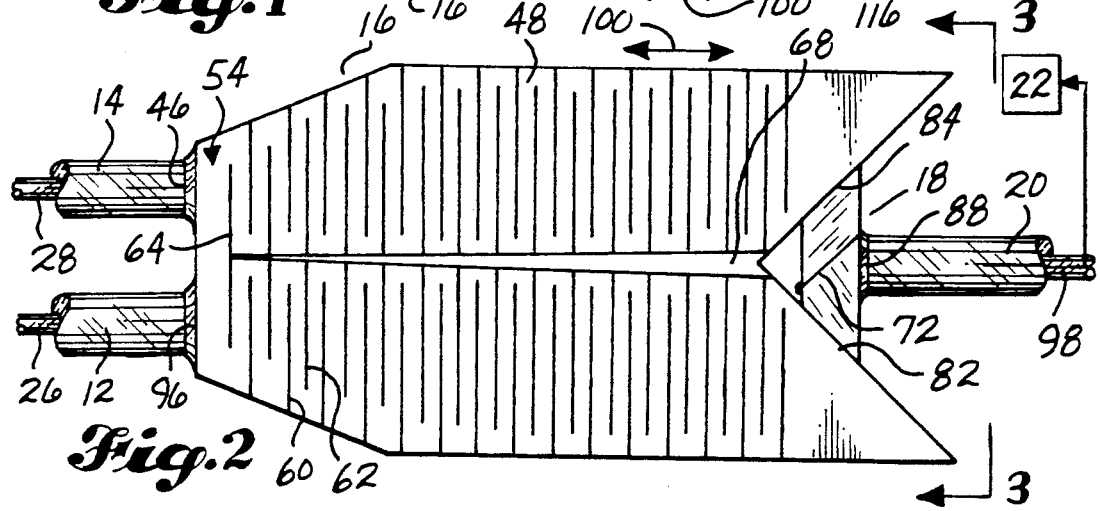
FIG. 2 is a view like FIG. 1, but showing the second side of the modulator, and showing a single electrode on such second side.

As previously explaihed, the film member 16 comes with a metal layer 46, 48 on each side. The metal layers 46, 48 must be etched to form two electrodes 50, 52 (FIG. 1) on a first side of the member 16 and a single electrode 54 on the second side (FIG. 2). The metal is removed along the transverse lines shown in FIGS. 1 and 2, some of which are designated 56, 58, 60, 62, 64. The metal is also removed from the narrow triangular regions 66, 68 extending longitudinally of the member 16. The break lines may be etohed either meohanically or by the use of acid.

The particular film used had a thickness of about 8 to 9 microns. The film was acquired from the Pennwalt Corporation which has regional sales offioes in Valley Forge, Pa., in Arlington Heights, Ill., and in Littleton, Colo. The Pennwalt PVDF film is marketed under the name (KYNAR), primarily for use in flexure switohes. A characteristic of the film is that it has a direction of elongation in which it will change its dimension in response to an applied electrical, voltage. This direction is indicated on the KYNAR film by arrows on the metal layers. Care must be taken to assure that the film is properly cut so that the arrows extend parallel to the length dimension of the iilm member 12. The direction of elongation must be in the direction of light travel through the film.

The beam splitter 18 is constructed from a thin piece of glass or other optioal material. It was found that a suitable material for this purpose was a microscope slide cover. A microslide cover is constructed from quartz or glass and it is of a suitable thickness and has suitable optical characteristios. Referring to FIG. 6, a piece of plastic tape (not shown) is attached to the slide cover (or equivalent member) 70, behind line 72. Then, a cut is made along line 72, to separate the glass member 156 into two parts which are held together by the tape. Next, cuts are made along lines 74, 76. This removes triangular pieces 78, 80 leaving a piece which in plan appears as is shown in FIGS. 1 and 2. This forms the beam splitter 18. The edges of the beam splitter 18 are inspected to make sure that they are smooth. Then, the ends of the beam splitter 18 are seoured to the modulator film member 16 by the use of an optical coupling cement at lines 82, 84. Also, the two pieces of the beam splitter may be secured together by applying optical cement at the opposite ends of the break 72. When the beam splitter 18 is secured in place, the tape is removed. The diagonal break 72 is positioned as shown in FIGS. 1 and 2.

A single mode polarization maintaining output cable 20 is provided. It is cleaved at its end and inspected to make sure that the cut is free of objectionable scratches. Then, the cable end is cemented to the longer edge of the beam splitter 18, as shown in FIGS. 1, 2 and 5. The cable core 86 projects beyond the cable jacket end 176. The coupling cement 88 bridges between end surface 90 and the beam splitter 18 (FIG. 5).

The second ends of the two cables 12, 14 are attached to the first end of the member 16 in essentially the same way. The ends are cleaved to provide a square cut on the cable cores 26, 28 and to cut the sheath back from the cores 26. 28. The square cut end (e.g end 92 on core 28) of each core 26, 28 is plaoed against the end 94 of member 16, and is seoured in place by an optioal oement 96 (FIG. 5). This is also shown in FIG. 7 whereat core 28 and the end of its sheath are cemented to member 76 at 44.

The light analyzer 52 may include a photodiode 102 (FIG. 8) whioh is similar in construction to the light source diode 10. The lens of the photodiode may be formed to include a socket for reoeiving an end portion of the cable oore 98 within cable 20. Cable 20 is cleaved and stripped at its second end. The exposed cable 98 is inserted into a drilled socket in the input lens of the photodiode. It is secured in place by use of a coupling compound 104, in the manner desoribed above with respect to the oonnection of cable cores 26, 28 to light source diode 10. The photodiode 102 converts light energy to electrical energy. The light analyzer 22 may also include an amplifier 106 for the eleotrical signal generated by the photodiode, and some sort of utilization devioe 108 for the signal, i.e. a control element which operates in response to the signal, a computer which receives the signal as a source of information, etc.

Referring to Figs. 1 and 2, in the embodiment which has just been described the direction of piezo electric movement is indicated by arrows 100. The separation lines 56 permit longitudinal movement of the film substrate. In other words, the separation lines separate the metal layers 46, 48 into movable segments. Without these separations 56, 58, 60, 62, 64 the metal layers 46, 48 would tend to hold the substrate against longitudinal movement.

PVDF film is available in thicknesses, expressed in microns, of 9, 16, 28, 52, 110, 220 and 800. In preferred form the 9 micron thick film is used. This provides a film that can readily transmit short wavelength light and which can be modulated at high speed by the application of a very small voltage to the film member 16. In installations requiring transmission of longer wavelength light, the 16 micron thick film will provide good results.

By way of example, the fiber optic cables 12, 14, 20 can be single mode optical fibers such as manufactured by YORK V.S.O.P., having a place of business at 210 N. Glenoaks Blvd., Suite C, Burbank, Calif. 91502.

In the drawings, it was not possible to both adequately illustrate the components and the connections and at the same time use an accurate scale. This is because the film member used for the film member 16 has, in preferred form, a thickness of only about 9 microns. The diameter of the cable cores 26, 28, 98 is only about six microns. The electrode material on the two sides of the film member 16 is thicker than the film material. However, in the drawings the electrodes 50 52, 54 are shown thinner. This is because the thickness of the film member 16 and the diameter of the cable cores 26, 28, 98 have been greatly exaggerated, to better show the connections which must be made. It was felt that to show the electrodes 50, 52, 54 in a thickness that is actually proportional to the film thickness would distract from the disclosure of the important relationships.

Figure 3:
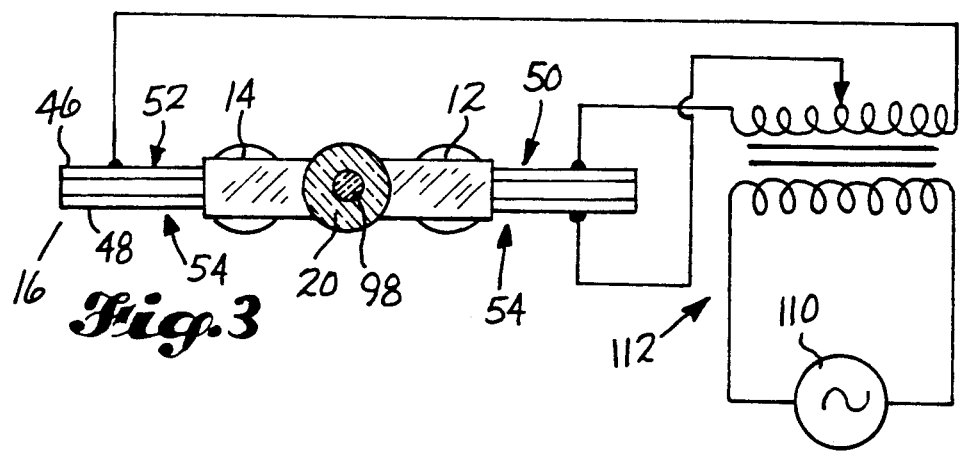
FIG. 3 is a scale sectional view taken substantially along line 3—3 of FIG. 2, such view including a schematic diagram of an adjustable electrical input to the electrodes.

As will be apparent, the control circuit (FIG. 3) converts an input stimulus to a voltage change which is inputted to the film member 16. The input stimulus may be a dimensional change in a structure, a light level change, a sound level change, a chemical change, etc. The invention has utility in any installation or environment in which it is desirable to use fiber optic technology in place of electrical circuitry.

A suitable transducer is used for converting the input stimulus into an electrical voltage. This electrical voltage is delivered to the input 110 of a transformer 112. In the illustrated embodiment, the transformer 112 is a step down transformer (e.g. 10 to 1 step down). In some installations, it might be desirable to use a step up transformer. It is also to be understood that a transistor circuit can be substituted for the transformer 112. Regardless of the type of input to the electrodes 50, 52, 54, in use there is a positive voltage applied to either the first electrode 50 or the second electrode 52, to cause an increase in the length of the film member 16, in the region of the film member disposed between such electrode (50 or 52) and the third electrode 54. Or, there may be an application of a negative voltage to either the first electrode 50 or the second electrode 52, to cause a shortening of the film member 16, in the region of the film member 16 disposed between such electrode (50 or 52) and the third electrode 54.

If a gas laser light source is used, the modulator can be driven by very small voltages, viz. ten to fifteen millivolts. If a light emitting diode is used, the operating voltage is about one to four volts.

Figure 9:
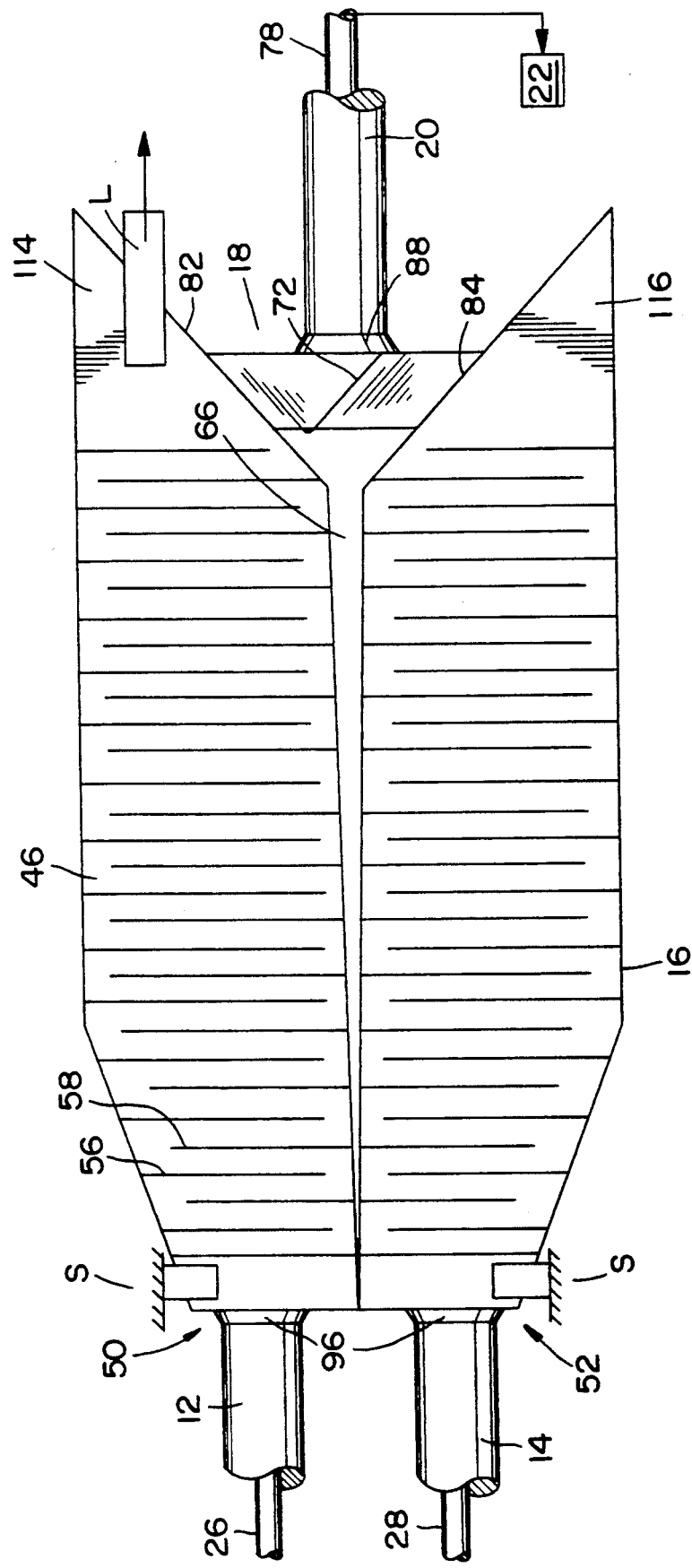
FIG. 9 is a view like FIG. 1 but a second embodiment in which the electrical input is replaced by a mechanical input.

It is also possible to omit the electrical input and instead apply a mechanical input to one side of the film member 16. For example, as shown in FIG. 9, the first end of the member 16 can be firmly secured to a structures, adjacent where the input cables 12, 14 are connected to it. Then, for example, the corner portion 114 of member 16 can be secured to a second location L, with corner portion 116 left unattached. A movement of the structure L to which corner 114 is attached, away from or towards the attached opposite end of the member 16, will cause a length change in the longitudinal section of film member 16 which includes input cable 12 and corner 114. The same length change will not occur in the section of film member 16 which includes cable 14 and corner 116. This is because corner 116 is not attached. The length differential between the two sections of the film member 16 will cause a phase change in the light beam from cable 12 relative to the light beam from cable 14, similar to the phase change caused by the electrical input, as described above. Accordingly, the modular can be used as a type of optical strain gauge.

From the foregoing, various modifications, component arrangements, and model of utilization of the invention will be apparent to those skilled in the art to which the invention is addressed. The scope of protection is not to be limited by the details of the embodiment which has been illustrated and described. Rather, the scope of protection is to be determined by the appended claims, interpreted in accordance with the established rules of patent claim interpretation, including use of the doctrine of equivalents.

What is claimed is:

1. An optical light modulator, comprising:
   a polarized polymer film member having first and second ends, first and second sides and a direction of piezo electric movement extending lengthwise of the film member;
   first and second electrodes on the first side of the film member, each extending lengthwise of the film member, said electrodes being separated by a longitudinal gap;
   a third electrode on the second side of the film member, said third electrode having a pair of side portions, each extending lengthwise of the film member, said portions being separated by a longitudinal gap extending through a major portion of the length of the film member;
   a pair of light sources connected to the first end of the film member on opposite sides of the longitudinal gaps;
   a beam splitter at the second end of the film member having opposite end portions, each positioned to receive light from a separate one of said light sources, which light has first traveled through the film member;
   a light analyzer connected to a central portion of the beam splitter, at a position to receive light from both end portions of the beam splitter; and
   an electrical energy input to the film member connecting the third electrode to a constant zero voltage, the first electrodes to a voltage varying between positive and negative, and the second electrode to a voltage varying between negative and positive.

2. The modulator of claim 1, wherein application of a positive voltage to either the first electrode or the second electrode will cause an increase in the length of the film member, in the region of the film member disposed between such electrode and the third electrode, and application of a negative voltage to either the first electrode or the second electrode will cause a shortening of the film member, in the region of the film member disposed between such electrode and the third electrode.

3. The modulator of claim 2, wherein the first, second and third electrodes each includes lateral breaks which facilitate length changes in the electrodes in response to length changes in the film material.

4. The modulator of claim 1, wherein each light source includes a fiber optic cable connected to the first end of the film member.

5. The modulator of claim 4, wherein the opposite end of each fiber optic cable is connected to a light emitting diode.

6. The modulator of claim 1, wherein the second end of the film member includes a triangular recess defined by edge portions of the film member which are 90 apart, and the beam splitter is an optical plate member having opposite ends cut to the angle of said edge portions and coupled to said edge portions, said beam splitter including a diagonal split at its center which is parallel to one of the edge portions, and said light analyzer includes a fiber optic cable having an end connected to the beam splitter, in line with the diagonal split and the longitudinal gaps.

7. An optical light modulator, comprising:

a polarized polymer film member having first and second ends, first and second sides and a direction of piezo electric movement extending lengthwise of the film member;

a pair of light sources connected to the first end of the film member on opposite sides of the longitudinal gaps;

a beam splitter at the second end of the film member having opposite end portions, each positioned to receive light from a separate one of said light sources, which light has first traveled through the film member; and a light analyzer connected to a central portion of the beam splitter, at a position to receive light from both end portions of the beam splitter.

8. The modulator of claim 7, wherein each light source includes a fiber optic cable connected to the first end of the film member.

9. The modulator of claim 8, wherein the opposite end of each fiber optic cable is connected to a light emitting diode.

10. The modulator of claim 7, wherein the second end of the film member includes a triangular recess defined by edge portions of the film member which are 90° apart, and the beam splitter is an optical plate member having opposite ends cut to the angle of said edge portions and coupled to said edge portions, said beam splitter including a diagonal split at its center which is parallel to one of the edge portions, and said light analyzer includes a fiber optic cable having an end connected to the beam splitter, in line with the diagonal split and the longitudinal gaps.

* * * * *

UNITED STATES PATENT AND TRADEMARK OFFICE
CERTIFICATE OF CORRECTION

PATENT NO. : 5,105,300
DATED : April 14, 1992
INVENTOR(S) : Christopher M. Gnehm It is certified that error appears in the above-identified patent and that said Letters Patent is hereby corrected as shown below:

On the title page,

In the Abstract, 12th line from the bottom, there is a period after "cable (14)"; and in the 5th line from the bottom, "splitter (118)" should be -- splitter (18) --.

In column 1,
line 20, "elliptioal" should be -- elliptical --.
line 33, "Seoond" should be -- Second --;
line 39, "electrioal" should be -- electrical --;
line 40, "funotion" should be -- function --;
line 41, "prinoipal objeot" should be -- principal object --;
line 46, "optioal" should be -- optical --;
line 52, "aocording" should be -- according --;
line 53, "Polarized" should be -- polarized --;
line 54, "direotion" should be -- direction --;
line 56, "looated" should be -- located --;
line 57, "eaoh" should be -- each --;
line 58, "seoond" should be -- second --; and
line 65, "oonnected" should be -- connected --.

UNITED STATES PATENT AND TRADEMARK OFFICE
CERTIFICATE OF CORRECTION

PATENT NO. : 5,105,300
DATED : April 14, 1992
INVENTOR(S) : Christopher M. Gnehm It is certified that error appears in the above-identified patent and that said Letters Patent is hereby corrected as shown below:

In column 2,
line 2, "li9ht" should be -- light --;
line 14, "eleotrode" should be -- electrode --;
line 15, "Applioation" should be -- Application --;
line 16, "seoond" should be -- second --;
line 19, "eleotrode" should be -- electrode --;
line 28, "Aocording" should be -- According --;
line 29, "seoond" should be -- second --;
line 30, "ed9e" should be -- edge --;
line 51, "eaoh" should be -- each --;
line 53, "ohanges" should be -- changes --;
line 60, "optioal" should be -- optical --;
lines 60, 61, "inolude" should be -- include --; and
line 61, "reoognized" should be -- recognized --.

In column 3,
line 16, "ohange" should be -- change --;
line 17, "If,the" should be -- If the --;
line 35, "bea splitter" should be -- beam splitter --;
line 39, "electrode" should be -- electrode --;

UNITED STATES PATENT AND TRADEMARK OFFICE
CERTIFICATE OF CORRECTION

PATENT NO.    :  5,105,300
DATED         :  April 14, 1992
INVENTOR(S)   :  Christopher M. Gnehm It is certified that error appears in the above-identified patent and that said Letters Patent is hereby corrected as shown below:

In column 3, line 41, "seotional" should be -- sectional --;

line 42, "suoh view inoluding" should be -- such view including --.

lines 42,43 "sohematio" should be -- schematic --;

line 43, "eleotrical" should be -- electrical --;

line 47, "soale" should be -- scale --;

line 63, "whioh" should be -- which --; and line 66, insert -- of -- after "but".

In column 4, line 6, "souroe" should be -- source --;

line 9, "whioh" should be -- which --;

line 12, "miorons or less in thiokness, to whioh" should be
     -- microns or less in thickness, to which --;

line 15, "wavelenqth as the liqht" should be -- wavelength
     as the light --;

line 18, "ooupled" should be -- coupled --;

line 22, "preoision" should be -- precision --;

line 34, "oables" should be -- cables --;

line 35, "oores" should be -- cores --;

line 37, "out" should be -- cut --;

UNITED STATES PATENT AND TRADEMARK OFFICE
CERTIFICATE OF CORRECTION

PATENT NO. : 5,105,300

DATED : April 14, 1992

INVENTOR(S) : Christopher M. Gnehm

It is certified that error appears in the above-identified patent and that said Letters Patent is hereby corrected as shown below:

In column 4, line 42, "reoeive" should be -- receive --;

line 45, "out to a reotangular" should be
    -- cut to a rectangular --;

line 48, "With" should be -- with --;

line 51, "out" should be -- cut;

line 53, "member 16," should be -- member 16'. --;

line 54, "outs" should be -- cuts --;

line 57, "eaoh" should be -- each --;

line 60, "out" should be -- cut --;

line 63, "signifioant" should be -- significant --;

line 64, "tWo" should be -- two --; and line 65, "macrosoopic" should be -- macroscopic --.

In column 5, line 6, "aoross" should be -- across --;

line 7, "prooess" should be -- process --;

line 8, "moleoular" should be -- molecular --;

line 16, "liqht" should be -- light --;

line 17, "signifioant" should be -- significant --;

UNITED STATES PATENT AND TRADEMARK OFFICE
CERTIFICATE OF CORRECTION

PATENT NO. : 5,105,300

DATED : April 14, 1992

INVENTOR(S) : Christopher M. Gnehm

It is certified that error appears in the above-identified patent and that said Letters Patent is hereby corrected as shown below:

In column 5, line 18, "Wavelength" should be -- wavelength --;

line 20, "eleotrio" should be -- electric --;

line 25, "manufaoture" should be -- manufacture --;

line 34, "direotional" should be -- directional --;

line 35, "oause" should be -- cause --;

line 36, "oare" should be -- care --;

line 38, delete "15" after "manner";

line 38, "eaoh out" should be -- each cut --;

line 40, "oan" should be -- can --;

line 47, "perpendioular" should be -- perpendicular --;

line 51, "beoause" should be -- because --;

line 53, "explaihed" should be -- explained --;

line 62, "etohed either meohanically" should be -- etched either mechanically --; and line 66, "offioes" should be -- offices --.

In column 6, line 1, "switohes" should be -- switches --;

line 4, "electrical,voltage" should be -- electrical voltage --;

UNITED STATES PATENT AND TRADEMARK OFFICE
CERTIFICATE OF CORRECTION

PATENT NO. : 5,105,300
DATED : April 14, 1992
INVENTOR(S) : Christopher M. Gnehm It is certified that error appears in the above-identified patent and that said Letters Patent is hereby corrected as shown below:

In column 6,
line 8, "iilm" should be -- film --;
line 12, "optioal" should be -- optical --;
line 16, "characteristios" should be -- characteristics --;
line 26, "seoured" should be -- secured --;
line 48, "plaoed" should be -- placed --;
line 49, "seoured in place by an optioal oement" should be
      -- secured in place by an optical cement --;
line 54, "whioh" should be -- which --;
line 56, "reoeiving" should be -- receiving --;
line 57, "oore" should be -- core --;
line 61, "desoribed" should be -- described --;
line 62, "oonnection" should be -- connection --;
line 65, "eleotrical" should be -- electrical --; and
line 67, "devioe" should be -- device --.

In column 7,
line 3, "Fiqs." should be -- Figs. --;
line 22, "manufaotured" should be -- manufactured --;
line 26, "oonnections" should be -- connections --;

UNITED STATES PATENT AND TRADEMARK OFFICE
CERTIFICATE OF CORRECTION

PATENT NO. : 5,105,300
DATED : April 14, 1992
INVENTOR(S) : Christopher M. Gnehm It is certified that error appears in the above-identified patent and that said Letters Patent is hereby corrected as shown below:

In column 7, line 34, "beoause" should be -- because --;

line 48, "whioh" should be -- which --;

line 57, "oan" should be -- can --;

line 60, "eleotrode 52, to oause" should be
-- electrode 52, to cause --;

line 61, "inorease" should be -- increase --;

line 62, "suoh" should be -- such --; and line 64, "applioation" should be -- application --.

In column 8, line 17, "oocur" should be -- occur --;

line 22, "oable" should be -- cable --;

line 26, "modifioations" should be -- modifications --;

line 27, "model" should be -- modes --;

line 31, "desoribed" should be -- described --;

line 32, "proteotion" should be -- protection --;

UNITED STATES PATENT AND TRADEMARK OFFICE
CERTIFICATE OF CORRECTION

PATENT NO. : 5,105,300
DATED : April 14, 1992
INVENTOR(S) : Christopher M. Gnehm It is certified that error appears in the above-identified patent and that said Letters Patent is hereby corrected as shown below:

In CLAIM 1, column 8, line 42, "seoond eleotrodes" should be -- second electrodes --;

line 43, "eaoh" should be -- each --;

line 52, "oonnected" should be -- connected --;

line 64, "eleotrode" should be -- electrode --; and line 66, "seoond" should be -- second --.

In CLAIM 2, column 9, line 7, "eleotrode" should be -- electrode -;

In CLAIM 3, column 9, line 14, "length" should be -- length --;

In CLAIM 6, column 9, line 22, "inoludes" should be
    -- includes --; and line 23, "90" should be -- 90° --.

In CLAIM 7, column 10, line 8, "seoond" should be -- second --; and

In CLAIM 10, column 10, line 27, "ooupled" should be -- coupled --.

Signed and Sealed this

Second Day of November, 1993

Attest:

BRUCE LEHMAN

Attesting Officer      Commissioner of Patents and Trademarks